(12) United States Patent
Weeks et al.

(10) Patent No.: US 6,243,184 B1
(45) Date of Patent: Jun. 5, 2001

(54) METHOD AND APPARATUS FOR LIGHT SCANNING

(75) Inventors: Alan L. Weeks, S. Easton; Gregory G. Cappiello, Lexington, both of MA (US)

(73) Assignee: ECRM, Inc., Tewksbury, MA (US)

( * ) Notice: Subject to any disclaimer, the term of this patent is extended or adjusted under 35 U.S.C. 154(b) by 0 days.

(21) Appl. No.: 09/169,272

(22) Filed: Oct. 9, 1998

(51) Int. Cl.⁷ .................................................. G02B 26/08
(52) U.S. Cl. ......................... 359/196; 359/198; 359/212; 359/216
(58) Field of Search ..................................... 359/196, 197, 359/198, 212, 216, 217; 347/256, 257, 258, 259, 260, 261

(56) References Cited

U.S. PATENT DOCUMENTS

| | | |
|---|---|---|
| 4,583,816 | 4/1986 | Kramer . |
| 4,973,112 | 11/1990 | Kramer . |
| 5,726,699 | * 3/1998 | Itami et al. ............................ 347/257 |
| 5,867,296 | * 2/1999 | Parl et al. .............................. 359/196 |

\* cited by examiner

Primary Examiner—Darren Schuberg
(74) Attorney, Agent, or Firm—Fish & Richardson P.C.

(57) ABSTRACT

A light scanner includes a beam deflector supported for rotary motion to deflect an incoming light beam into an image field in response to being rotationally aligned. A motor mechanically couples to rotate the deflector in and out of the rotational alignment. The beam deflector scans the image field with the deflected incoming light in response to being rotated. A gas permeable screen structure partially encloses a region adjacent the rotating beam deflector and reduces gas turbulence in the region of the deflector.

18 Claims, 9 Drawing Sheets

METHOD AND APPARATUS FOR LIGHT SCANNING

BACKGROUND OF THE INVENTION

The invention relates generally to optical scanners and, more particularly, to methods and apparatus for controlling the airflow produced by a rotating optical component.

Some printers and scanners employ optical sources such as lasers to repeatedly scan an image field. For example, the light beam may sweep out a strip on an object being scanned while the surface of the object moves past the scanning beam. The object may be a document or a surface covered with a photo sensitive medium such as unexposed film or a laser printing drum. To variably expose the photo sensitive medium, the scanning beam may be modulated. To produce the repeated sweep scans, the scanner may employ a rotating mechanical device which sweeps an incoming optical beam along the scan strip at least once during each rotation period.

Figure 1:
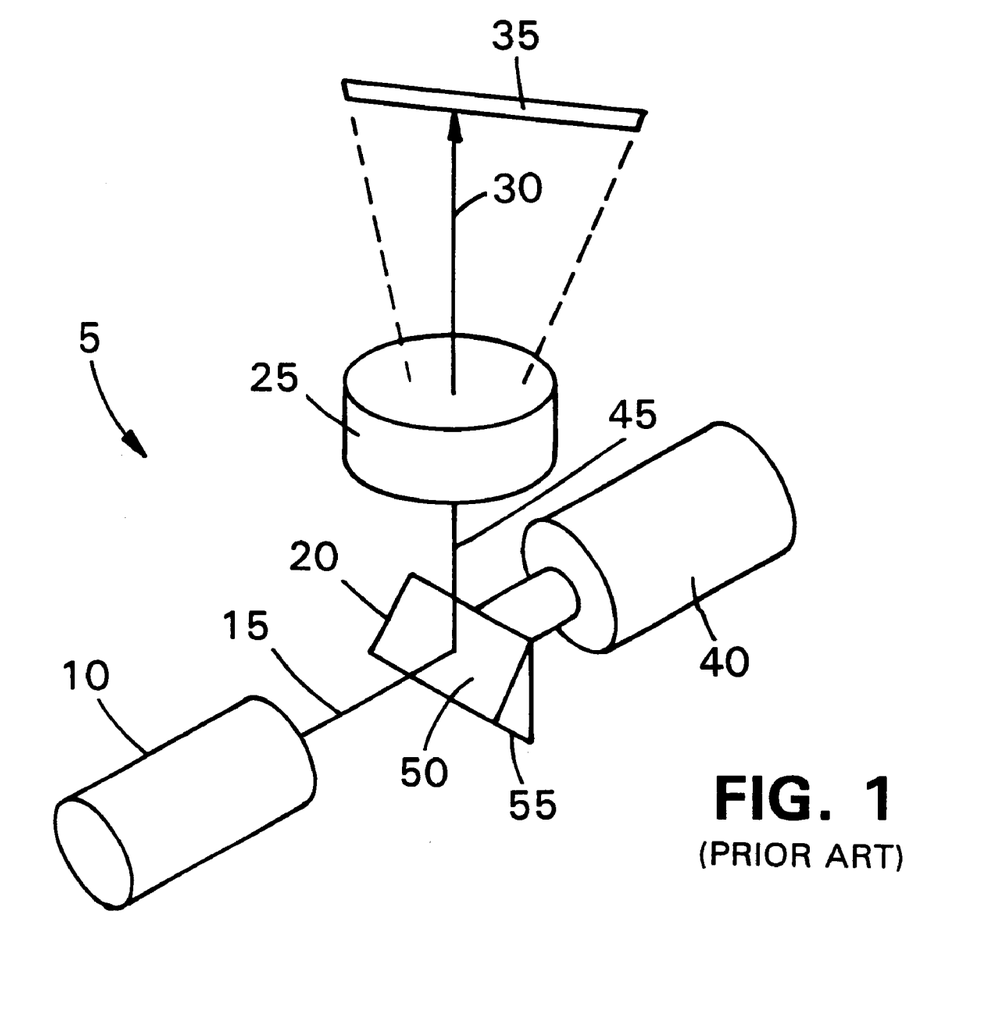
FIG. 1 schematically illustrates a prior art light scanner.

FIG. 1 schematically illustrates a portion of a light scanner 5. A light source 10 produces an incoming visible or infrared light beam 15. A mirror 20 has one or more reflecting facets 50, 55 that deflect the incoming light beam 15, towards a focusing lens system 25, which produces a scan beam 30. The scan beam 30 sweeps out a scan strip 35 in the image field. To produce the sweeping action of the scan beam 30, a motor 40 rotates the mirror 20 at a pre-determined angular velocity. During a portion of the rotation period of the mirror 20, the scan beam 30 sweeps out the strip 35.

For a high resolution scan, the strip 35 is a very fine, for example, less than about ¹⁄₁₀₀₀ of an inch wide. To scan an image field rapidly with such fine scan beams, the motor 40 typically turns the mirror 20 at a high frequency, for example, 20,000 revolutions per minute (RPM).

In high-resolution printing, very small variations in the scan beam 30 can produce image defects detectable by the human eye. Time-varying refractive indices along the incoming and/or deflected light beams 15, 45 can displace the scan beam 30 by as much as the distance between successive scan strips 35 on the object being scanned (not shown) thereby causing the image defects. Small variations in the local air density can produce a changing refractive index sufficient to cause such image defects in highresolution devices.

The rotating mirror 20 generates pressure waves in the adjacent air. A first source of such waves is a time-changing form, which an axially non-symmetric and rotating mirror presents to adjacent air, in each direction about the rotation axis. For example, the facets 50, 55 destroy full axial symmetry of the mirror 20. A second source of pressure waves is viscous drag caused by the rotational velocity of the mirror 20. Viscous drag can produce pressure waves even if the mirror 20 is replaced by a very symmetric beam deflector (not shown) such as a hologon or holographic deflector. For high-resolution scanners, the high rotational speed of the mirror 20 can produce turbulent and/or vortex airflow in the work space surrounding the mirror 20. The vortex or turbulent air flow presents a time-dependent air density and refractive index for the incoming and reflected beams 15, 45. The turbulent airflow can noticeably degrade the quality of an image scan by introducing image defects known as turbulence banding.

One method of eliminating image defects such as turbulence banding entails evacuating the work space around rotating optical parts such as the mirror 20 of FIG. 1. Evacuating the work space generally requires a complex and costly vacuum source. The vacuum source may also add significant bulk to the optical scanner. Thus, operating the rotating mirror in a vacuum may not be a convenient or cost-efficient method for eliminating defects such as turbulence banding.

The present invention is directed to overcoming, or at least reducing, one or more of the problems set forth above.

SUMMARY OF THE INVENTION

In a first aspect, the invention provides a light scanner. The light scanner includes a beam deflector supported for rotary motion to deflect an incoming light beam into an image field in response to being rotationally aligned. A motor mechanically couples to rotate the deflector in and out of the rotational alignment. The deflector scans the image field with the deflected incoming light in response to being rotated. The invention features a gas permeable screen structure partially enclosing a region adjacent the rotating deflector. The screen structure reduces gas turbulence in the region of the deflector.

In a second aspect, the invention provides a method of optically scanning an image field. The method features deflecting an incoming light beam off a beam deflector to produce a deflected light beam and rotating the beam deflector to scan an image field with the deflected beam. The beam deflector rotates in a gaseous environment. The method features passing a portion of a gas flow between the rotating beam deflector and the adjacent region through a screen structure.

BRIEF DESCRIPTION OF THE DRAWINGS

Other objects, features, and advantages of the invention will be apparent from the following description taken together with the drawings in which.

DESCRIPTION OF THE PREFERRED EMBODIMENTS

Figure 2A:
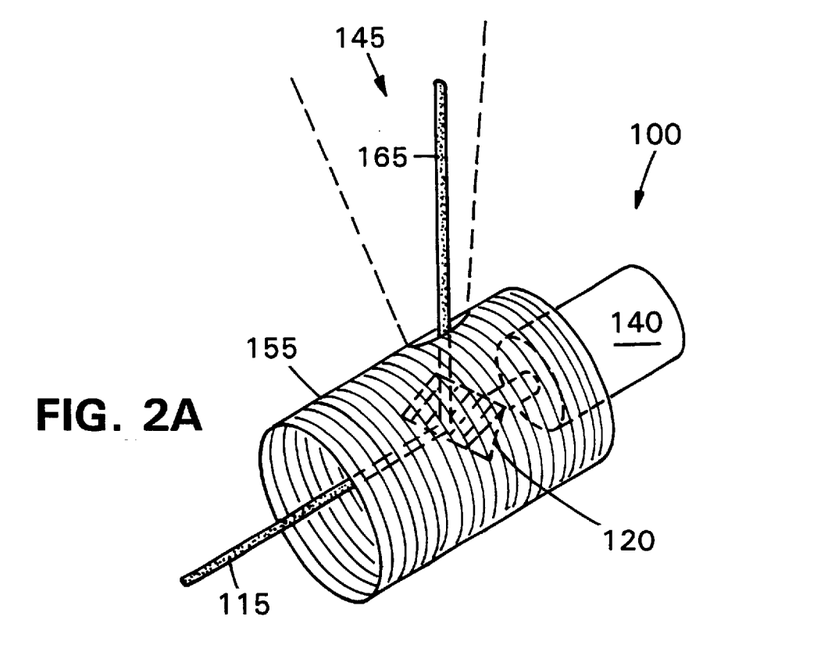
FIG. 2A schematically illustrates one embodiment of a light scanner.

FIG. 2A schematically illustrates one embodiment of a light scanner 100. The light scanner 100 has a beam deflector 120 that deflects an incoming light beam 115. In the various embodiments, the incoming light beam 115 may be visible, infrared, or ultraviolet light. When the beam deflector 120 is rotationally aligned, the deflected light beam 165 enters an image field 145. A motor 140 mechanically couples to rotate the beam deflector 120 into and out of the rotational alignment. The deflector 120 rotates in an ambient gas such as air at atmospheric pressure. The beam deflector 120 scans the image field 145 with the deflected incoming light beam 165 in response to being rotated by the motor 140. A screen structure 155 partially encloses a region adjacent to the beam deflector 120. The screen structure 155 is adapted to enable gas to flow into and out of the region surrounding the beam deflector 120 and reduces turbulence of the gas flows produced by the rotation of the beam deflector 120.

Figure 2B:
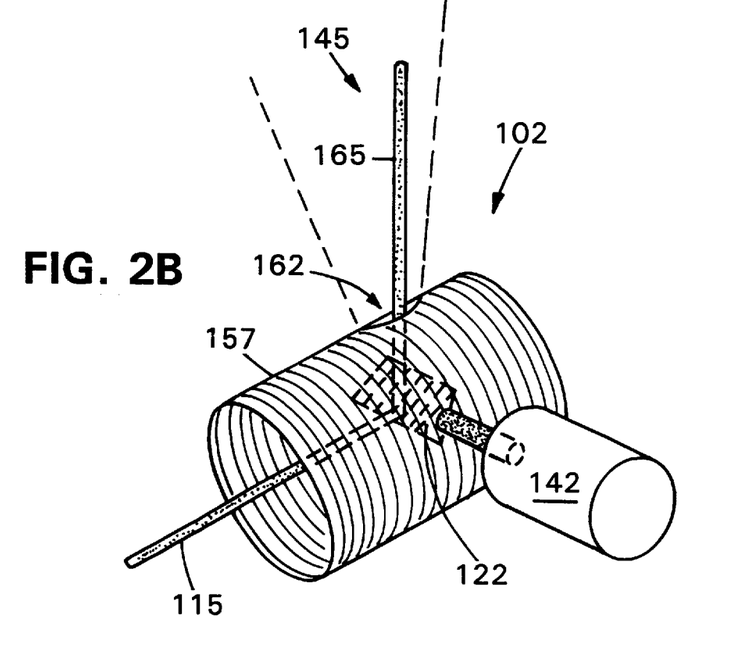
FIG. 2B schematically illustrates an embodiment of a light scanner for which the beam deflector rotates about an axis substantially perpendicular to the incoming light beam.

FIG. 2B schematically illustrates a second embodiment of a light scanner 102. The light scanner 102 has a beam deflector 122 to deflect the incoming beam 115 of visible, infrared, or ultraviolet light. When the beam deflector 122 is rotationally aligned, the deflected light beam 165 enters the image field 145. A motor 142 mechanically rotates the beam deflector 122 into and out of the rotational alignment. In contrast to the parallel alignment between the rotational axis of the deflector 120 and the incoming light beam 115 in FIG. 2A, the rotational axis of the beam deflector 122 is substantially perpendicular to the incoming light beam 115 in FIG. 2B. The deflector 122 rotates in an ambient gas and scans the image field 145 with the deflected incoming light beam 165 in response to being rotated by the motor 142. At equal frequencies of the motors 140, 142 of FIGS. 2A and 2B, the canner 102 of FIG. 2B may perform a single sweep of the image field 145 in about half the time for a single sweep by the scanner 100 of FIG. 2A.

Still referring to FIG. 2B, a screen structure 157 substantially encloses a region adjacent to the beam deflector 122. A hole 162 in the screen structure 157 enables the deflected beam 165 to pass into the image field 145 unimpeded. The screen structure 157 is permeable to gas flow into and out of the region adjacent the beam deflector 122 and reduces turbulence in the gas flows produced by the rotating beam deflector 122.

Referring to FIGS. 2A and 2B, the beam deflectors 120, 122 may take a variety of forms. In some embodiments, the beam deflectors 120, 122 are mirrors or prisms. Such devices employ reflection or total internal reflection to deflect the incoming light beam 115. These reflection devices may have several differently oriented reflecting facets. For example, the deflector 120 of FIG. 2A may be a pyramidale mirror or prism, and the deflector 122 of FIG. 2B may be a polygonal cross section bar with a separate mirror on each facetted side face of the bar. Other embodiments of the beam deflector 120 employ a diffraction device such as a grating or holographic deflector, e.g., a hologon, to deflect the incoming beam 115. The diffraction devices may also have several differently oriented deflecting facets. Henceforth, beam deflector shall include the above-described devices.

Figure 2C:
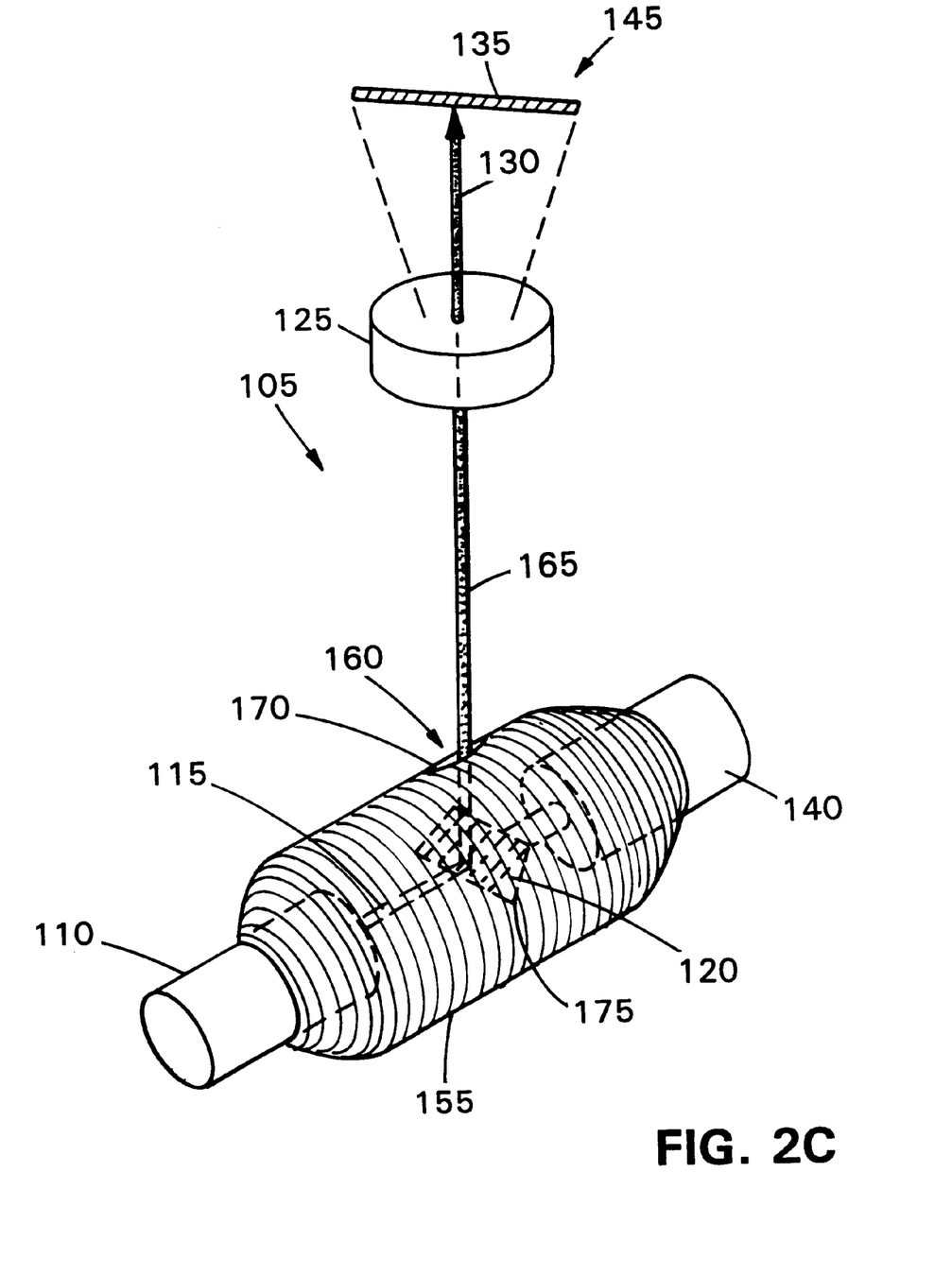
FIG. 2C schematically illustrates a specific embodiment of the light scanner of FIG. 2A.

FIG. 2C schematically illustrates a specific embodiment 105 of the light scanner 100 of FIG. 2A. A light source 110 such as a visible, infrared or ultraviolet laser produces the incoming light beam 115. When properly aligned, the beam deflector 120 deflects the incoming light beam 115 towards a focusing lens system 125, which produces a scan beam 130.

Still referring to FIG. 2C, the scan beam 130 sweeps out a scan strip 135 in the image field 145 as the motor 140 rotates the deflector 120. For high-resolution scanning, the scan beam 130 may have a width of less than about $1/1000$ of an inch at the scan strip 135. To scan a photo sensitive surface or a document (both not shown) rapidly, the motor 140 of an embodiment for a high-resolution scanner operates at a high frequency, for example, about 15,000 to 20,000 RPM. Some embodiments also increase the scan speed by employing two or more differently-oriented deflecting facets 170, 175 on the deflector 120. The different facets 170, 175 deflect the incoming beam 115 towards the lens system 125 during separate portions of the rotation cycle of the deflector 120.

Referring to FIGS. 2A, 2B, and 2C, some embodiments employ the light scanners 100, 102, 105 in high-resolution laser printers or optical document scanners. The deflected light beam 165 may scan a document (not shown) or may expose the photo sensitive medium on an unexposed film or a laser printing drum. For variably exposing the photo sensitive medium, the scanning beam may be modulated.

Referring to FIGS. 2A, 2B, and 2C, the screen structures 155, 157 reduce turbulence due either to the axially non-symmetric shape or to the high viscous drag of the rotating beam deflectors 120, 122. As air passes through the screen structures 155, 157, the turbulence of the flows substantially lessen thereby lowering turbulence in the regions surrounding the deflectors 120, 122. In the specific embodiments, the screen structures 155, 157 are substantially rigid and formed of either a mesh material or a perforated sheet.

Referring to FIG. 2C, the screen structure 155 attaches to one or more non-moving structures of the scanner 105, and substantially defines or encloses a "work space" about the deflector 120. In the illustrated embodiment, the screen structure 155 only defines a portion of the boundary of the work space. Remaining portions of the boundary are defined by the non-moving structures to which the screen structure 122 attaches. A hole 160 in the screen structure 155 enables the deflected light beam 165 to exit the "work space" unimpeded by the material of the screen structure 155. The work space is large enough to allow free rotation of the deflector 120, but is small enough to significantly reduce the creation of vortex turbulence therein.

Still referring to FIG. 2C, a variety of factors determine the optimal shape and dimensions for the "work space" enclosed by the screen structure 155. These factors include: the rotational frequency of the motor 140, the size and shape of the deflector 120, and the dimensions of any solid housing (not shown) enclosing the light scanner 105. The screen structure 155 may have a cylindrical or an axially non-symmetric cross section. In some embodiments, the width of the screen structure 155 is not substantially larger than the width needed for free rotation of the deflector 120. In various embodiments, the work region inside the screen structure 155 is substantially smaller than the region enclosed by any solid housing (not shown) surrounding the scanner 105. The size, form, and composition of the screen structure 155 satisfy the condition that the light scanner 105 not produce turbulence banding noticeable to the human eye.

Figure 2D:
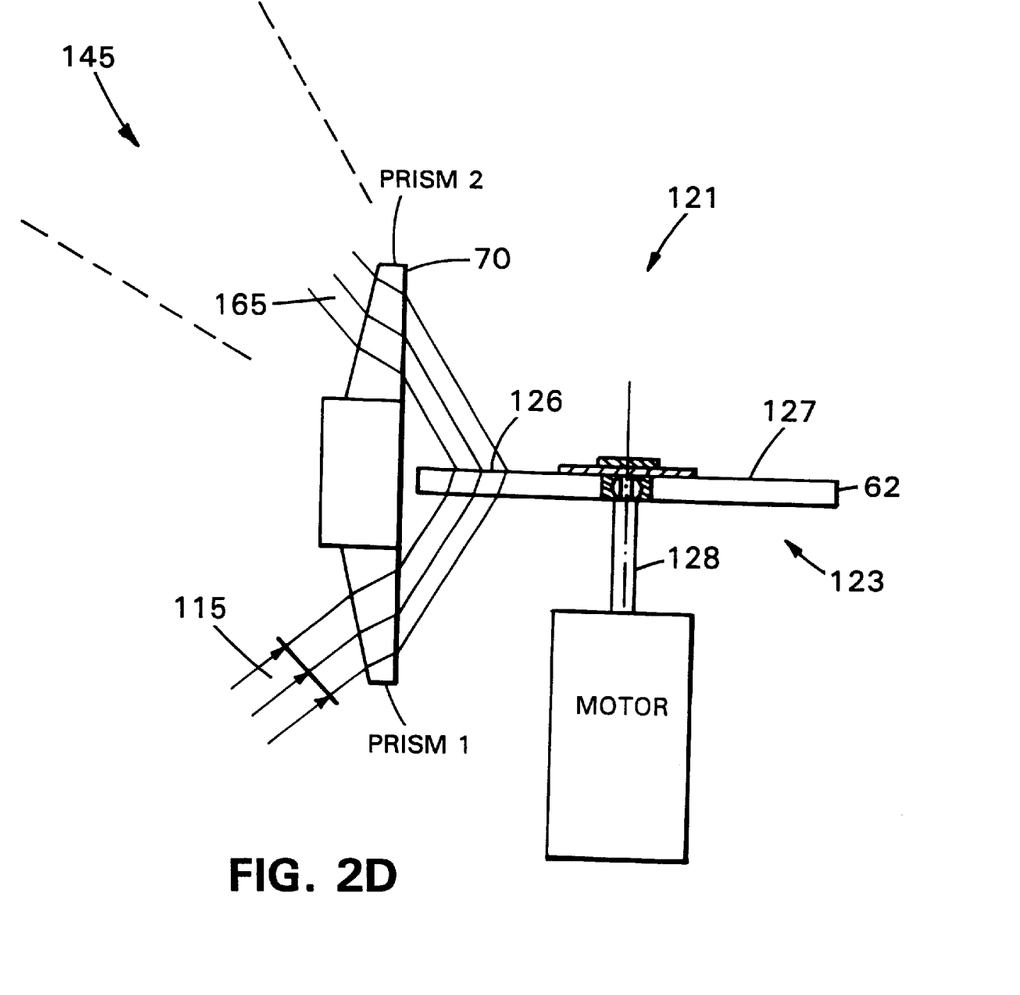
FIG. 2D illustrates a beam deflector employing a hologon deflection system.

FIG. 2D illustrates a hologon deflection system 121 employed by some embodiments for the light beam deflectors 120, 122 of FIGS. 2A–2C. The hologon deflection system 121 includes a disk-shaped hologon 123 having one or more holographic portions 126, 127 therein. Each holographic portion 126, 127 deflects the incoming light beam 115 into the scan field 145 in response to being rotationally aligned therewith. A shaft 128 couples the hologon 123 to the motor 140, 142.

Still referring to FIG. 2D, some embodiments employ hologons and hologon deflection systems described in U.S.

Pat. Nos. 4,973,112 and 4,583,816. U.S. Pat. Nos. 4,973,112 and 4,583,816 are incorporated by reference herein, in their entirety.

Figure 3A:
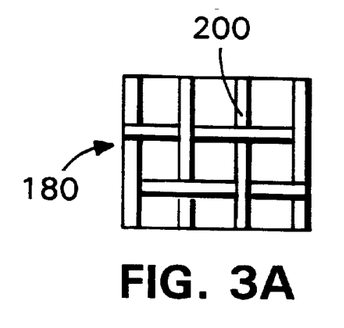
FIGS. 3A–3E illustrate various materials that the embodiments of FIGS. 2A, 2B, and 2C may use for a screen structure.
Figure 3B:
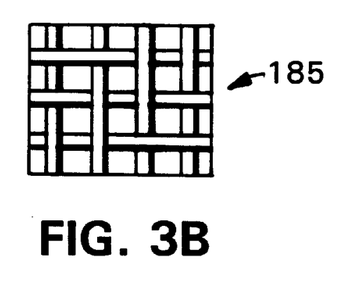
Figure 3C:
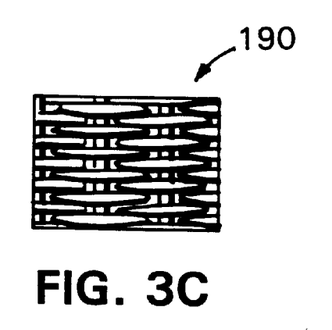
Figure 3D:
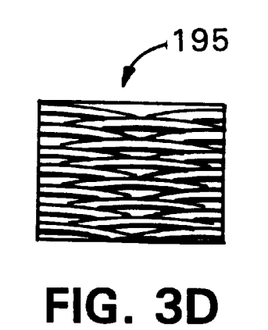
Figure 3E:
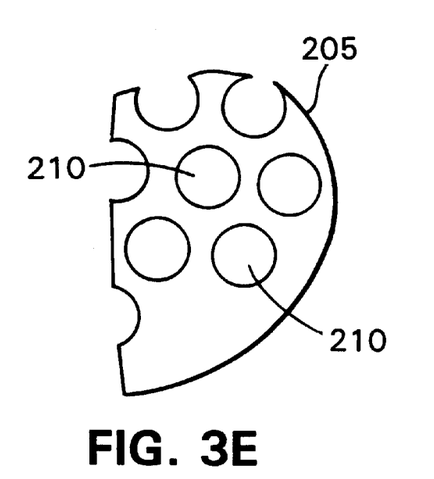

FIGS. 3A–3E illustrate materials usable for constructing the screen structures 155, 157 of FIGS. 2A, 2B, and 2C. FIGS. 3A–3D show steel wire meshes having a plain weave 180, a twilled weave 185, a plain-dutch weave 190, and a twilled-dutch weave, respectively. Some embodiments in which the beam deflectors 120, 122 turn at about 15,000 to 16,000 RPM use the plain weave wire mesh 180 with 12, 16, or 20 wires, (identified as 200) per inch for the screen structures 155, 157. Exemplary diameters for the wires 200 are about 0.023, 0.016, or 0.013 inches; 0.026, 0.018, or 0.009 inches; and 0.020 inches for 12, 16, and 20 wire-per-inch meshes, respectively. FIG. 3E shows a perforated metal sheet material 205 that may also be used for constructing the screen structures 155, 157. Some embodiments, in which the deflectors 120, 122 turn at about 15,000 to 16,000 RPM, use the perforated metal sheet material 205 with holes 210 having a diameter of about 0.125 inches and a center-to-center spacing of about 0.188 inches. The invention also covers other compositions that a person of skill in the art, and having the knowledge of this disclosure, would know to use for the screen structures 155, 157.

Referring again to FIGS. 2B and 2C, the holes 162, 160 through the screen structures 157, 155 may have different shapes and sizes. In some embodiments, the dimensions of the holes 162, 160 approach the minimum size needed to ensure that the deflected beam 165 do not intercept the hole 162, 160 during a scan. In such embodiments, the holes 162, 160 take the general form of a narrow slot oriented perpendicular to the axis of rotation of the deflectors 122, 120. In other embodiments, the holes 162, 160 take a more oval form. In most embodiments, the area of the holes 162, 160 is less than about 5 to 10 percent of the total area of the respective screen structure 157, 155 so that the holes 162, 160 are not sources of substantial turbulence.

In the various embodiments, the construction, shape, and size of the screen structures 155, 157, and the holes 160, 162 of FIGS. 2A, 2B, 2C are determined by the requirement that the images produced by the light scanners 100, 102, 105 not contain noticeable turbulence banding. Noticeable turbulence banding generally imposes pseudo-random modulation on solid color regions of the image, which is perceptible to the human eye.

Referring again to FIGS. 2A, 2B and 2C, the light scanners 100, 102, 105 do not produce turbulence banding visible to the unaided human eye. But removal of the screen structures 155, 157 would introduce turbulence banding into images formed by some embodiments of the light scanners 100, 102, 105.

Figure 4A:
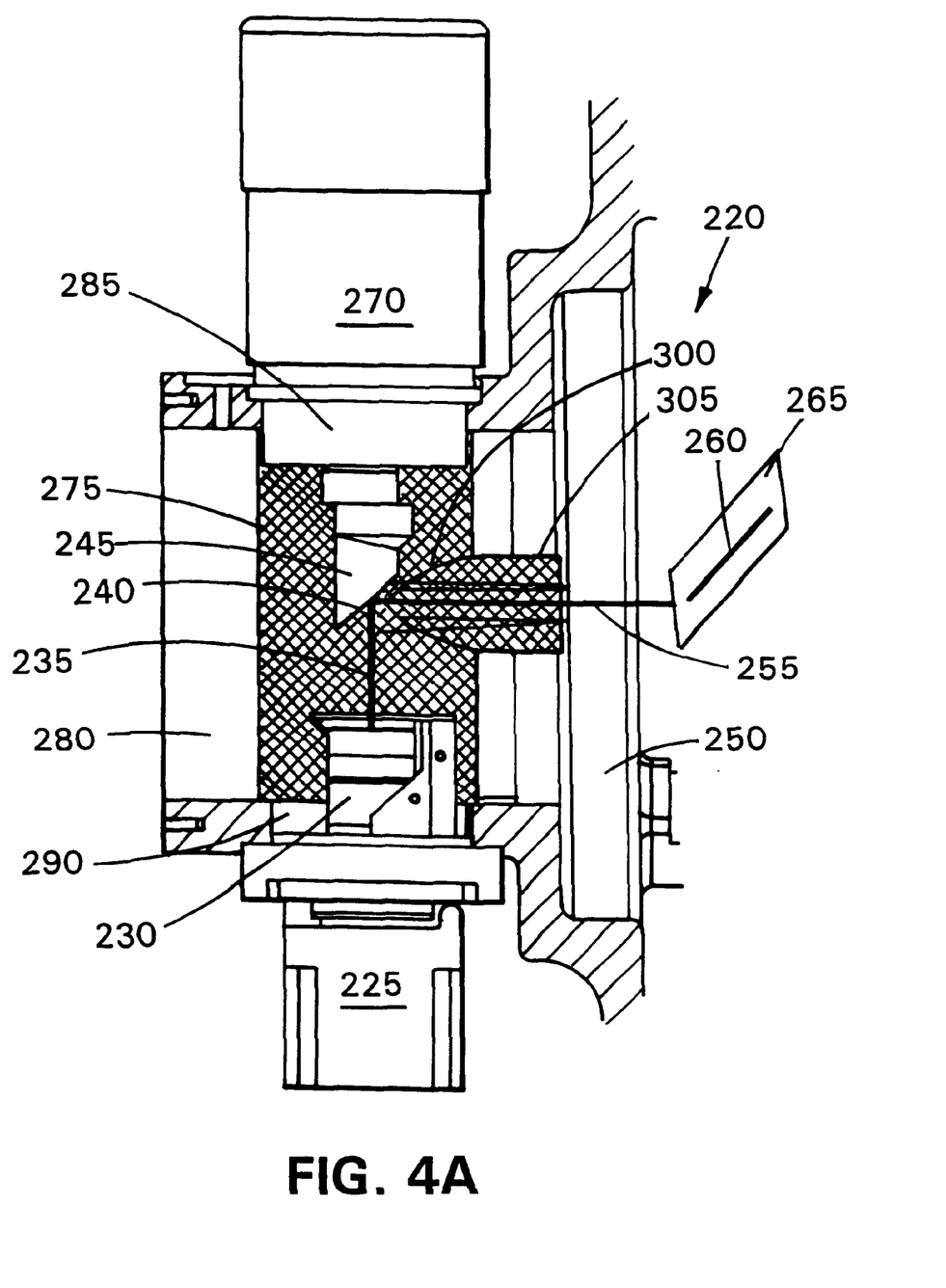
FIG. 4A shows a cut-away side view of a specific embodiment for a light scanner.

FIG. 4A is a cut-away side view of a specific embodiment 220 of the light scanners 100, 105 of FIGS. 2A and 2C. A laser 225 and optical train 230 produce a collimated incoming light beam 235. A facet 240 of a rotating mirror 245 deflects, i.e. reflects, the incoming light beam 235 toward a focusing lens system 250 in response to being rotationally aligned therewith. The deflected beam 255 sweeps out a scan strip 260 in the image field 265 as the mirror 245 is rotated by a motor 270.

Still referring to FIG. 4A, the motor 270 rotates the mirror 245 at a high frequency to produce a rapid scan.

In one embodiment, the turning frequency is between about 15,000 to 20,000 RPM, and the deflected beam 255 has a width of less than between about 1/500 and 1/2000 of an inch on the image field 265.

Still referring to FIG. 4A, the rotating mirror 245 and the optical train 230 are located in a substantially enclosed work space. The sidewalls of the work space are formed by a screen structure 275 and solid housing cap 280. The screen structure 275 attaches rigidly to the interior surface of the housing cap 280. End faces of the work space are formed by solid housing structures 285, 290 and the optical train 235. The mirror 245 and screen structure 275 are located inside a volume substantially defined by the metal housing structures 285, 290, and solid housing cap 280. The work space enclosed by screen structure 275 is less than about ¼ of this volume.

Figure 4B:
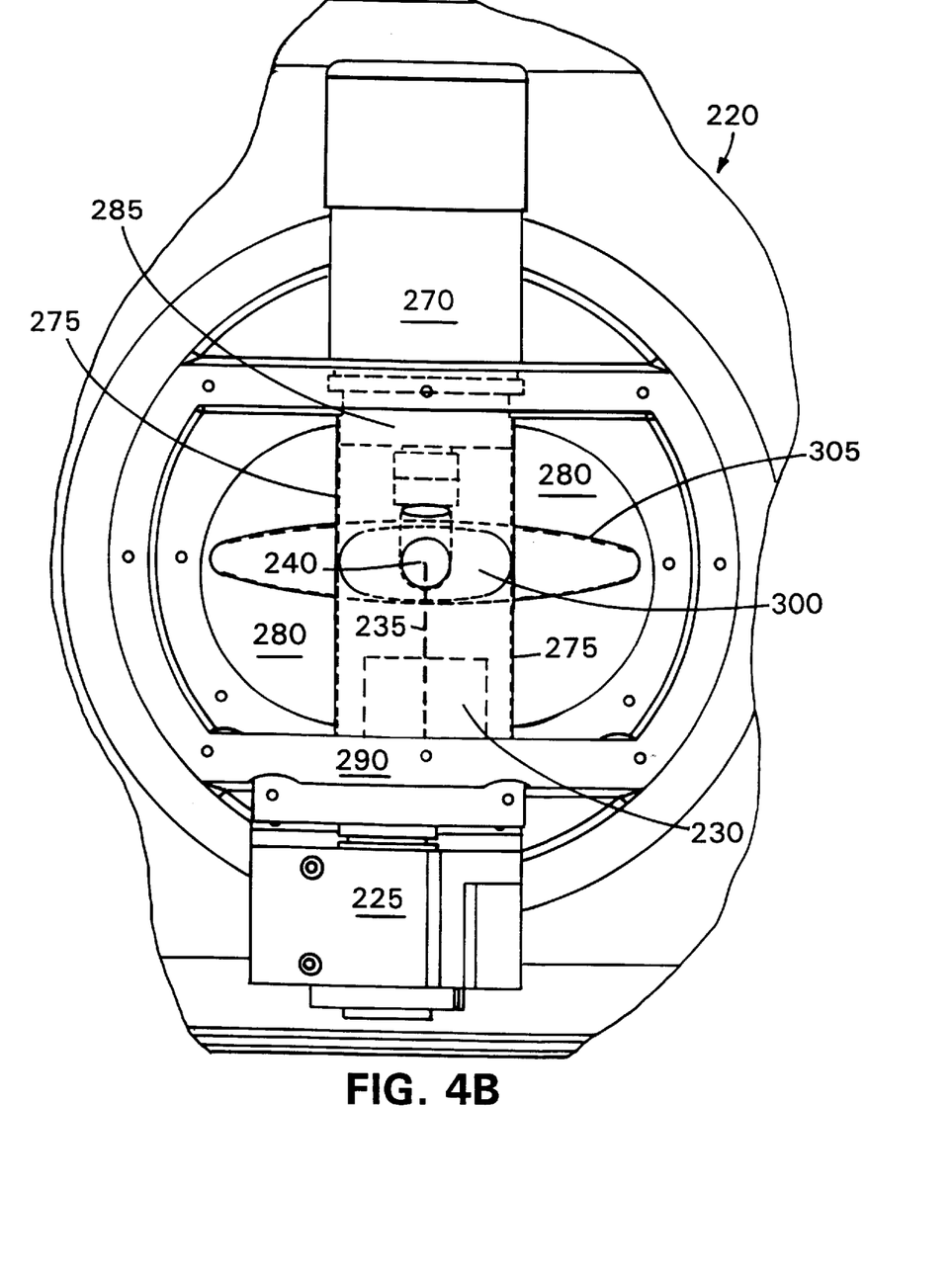
FIG. 4B shows is cut-away front view of the specific embodiment of FIG. 4A.

FIG. 4B is a cut-away front view of the light scanner 225 of FIG. 4A. The screen structure 255 includes a transversely-oriented oblong hole 300 for transmitting the light beam reflected by the facet 240 of the mirror 245. In this illustrated embodiment, a frustro-conical parabolic shroud screen 305 attaches to the edges of the oblong hole 300. The hole 300 has major axis about 1.5–2 times as long as the minor axis; the major axis has a width comparable to the width of the screen structure 275. In the same embodiment, the length of the shroud 305 is between 0.5 and 1 times the diameter of the region inside the screen structure 275, the transverse width varies from about 1 to 2–3 times the same diameter, and the vertical width is about ⅓ to ⅔ times the same diameter. The shroud 305 further reduces turbulence, which the hole 300 would otherwise create along the path of the reflected beam 255 (see FIG. 4A).

Figure 5A:
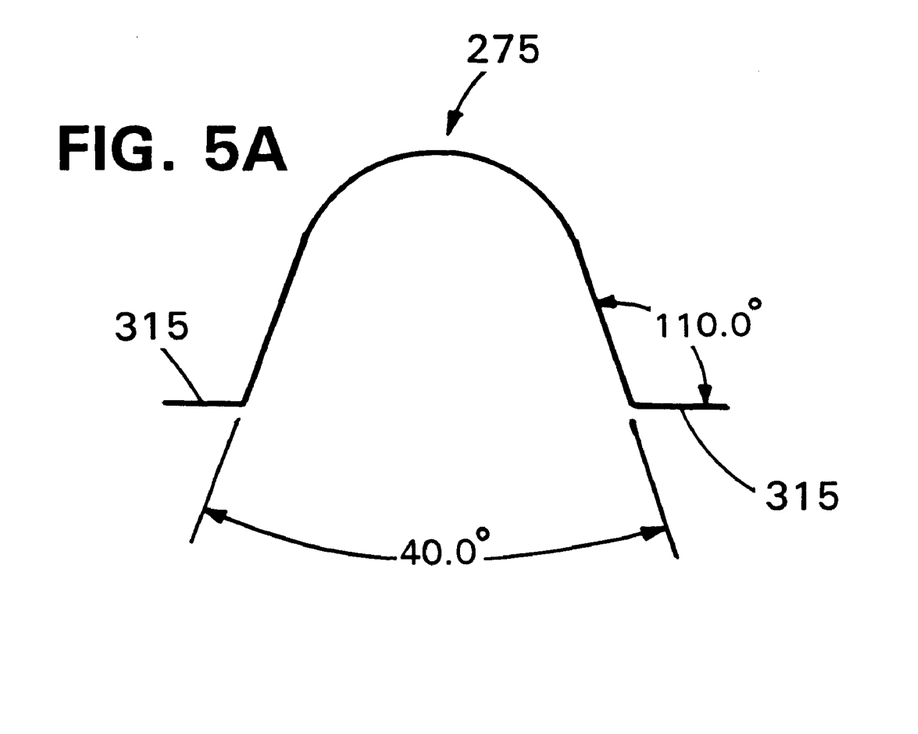
FIGS. 5A and 5B are top and front views of an alternate embodiment for the screen structure employed by the light scanner of FIGS. 4A and 4B.
Figure 5B:
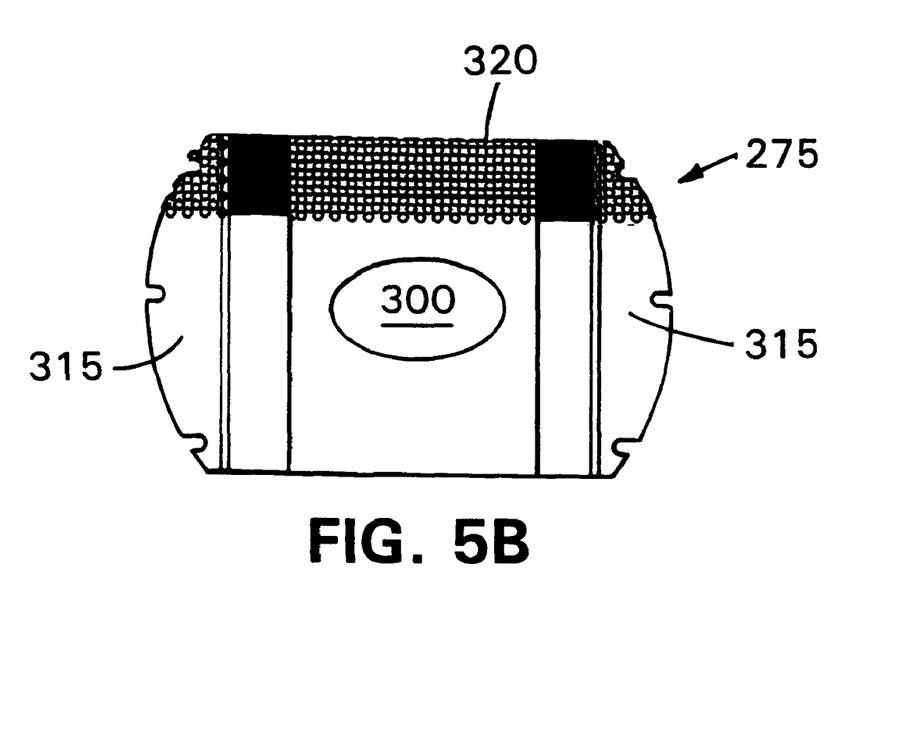

FIGS. 5A and 5B show front and top views of the screen structure 275 of the light scanner 220 of FIGS. 4A and 4B. The screen structure 275 has a generally semi-cylindrical form. Tabs 315 project from side edges to enable attaching the screen structure 275 to the housing cap 280 with screws (not shown). In the illustrated embodiment, the screen structure 275 is constructed with the perforated sheet material 205 of FIG. 3E. For this embodiment the mirror 245 is about 1 inch wide and turns at about 15,000 to 20,000 RPM. The screen structure is cylindrical and about 3–5 times as wide as the rotating mirror 245 and has a height about 2–4 times the width. The dimensions of the shroud 305 and hole 300 have been described above. The size and construction of the screen structure 275, hole 300, and shroud 305 eliminate noticeable turbulence banding in the image produced by the light scanner 220.

Figure 6:
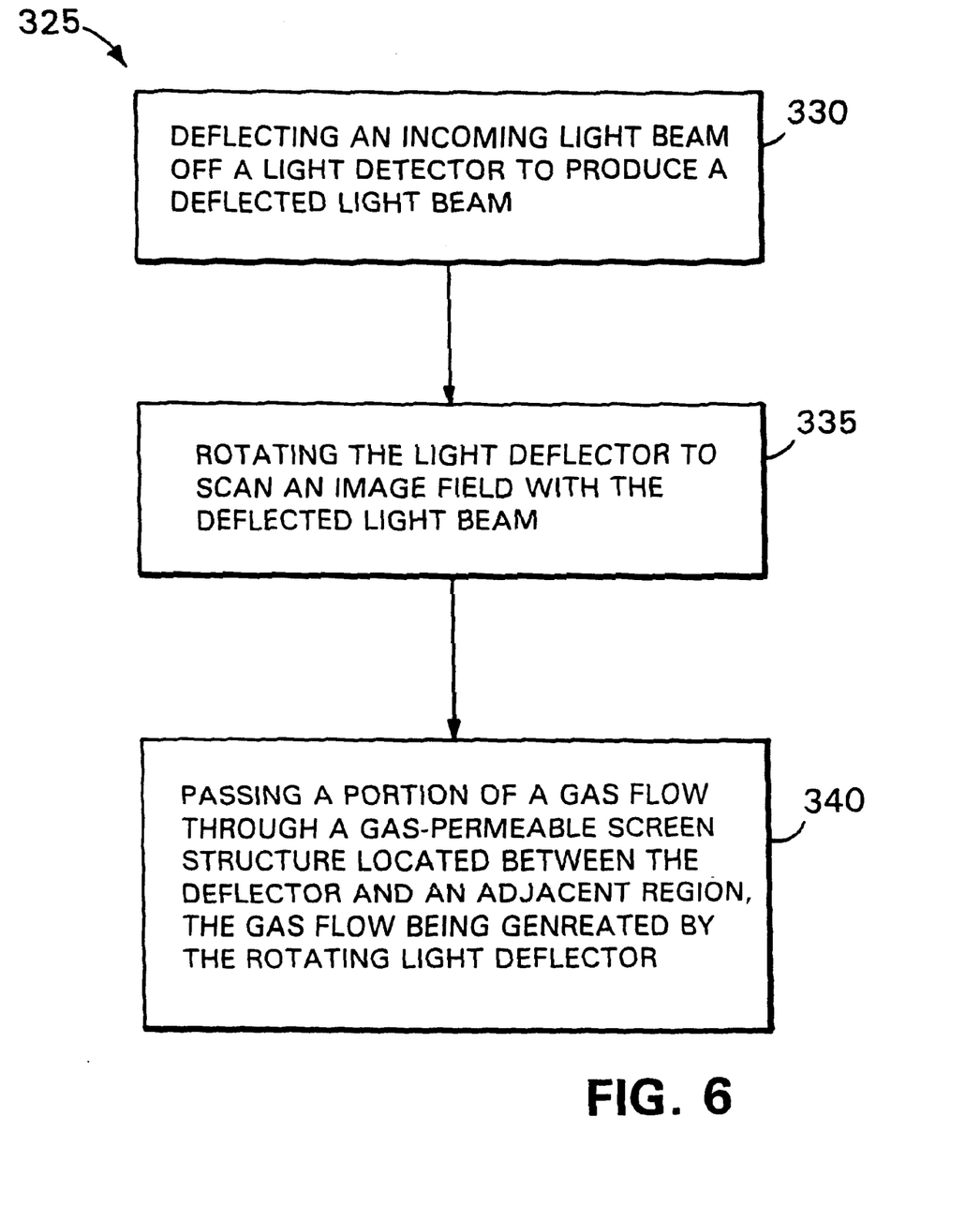
FIG. 6 is a flow chart illustrating an embodiment of a method for optically scanning.

FIG. 6 is a flow chart illustrating a method 325 for scanning an image with the light scanners 100, 102, 105 of FIGS. 2A, 2B, and 2C. At block 330, the beam deflector 120, 122 deflects the incoming light beam 115 to produce the deflected light beam 165. In some embodiments, the lens system 125 focuses the deflected beam 165 into the narrow scan beam 130. At block 335, the deflector 120, 122 rotates so that the deflected light beam 165 scans image field 145. The deflector 120, 122 rotates in a gaseous environment such as ambient atmospheric air. At block 340, a portion of a gas flow generated by the act of rotating passes through the screen structure 155, 157 located between the deflector 120, 122 and the adjacent region. Passing a portion of the gas flow through the screen structure 155, 157 reduces turbulence thereby reducing refraction index variations along the light beams 115, 165. Turbulence bands are absent from the image formed by the method 325.

Other additions, subtractions, and modifications of the described embodiments may be apparent to one of ordinary skill in the art.

What is claimed is:

1. A light scanner, comprising:
    a beam deflector supported for rotary motion to deflect an incoming light beam into an image field in response to being rotationally aligned;

a motor mechanically coupled to rotate the deflector in and out of the rotational alignment, the beam deflector scanning the image field with the deflected incoming light in response to being rotated; and a gas permeable screen structure at least partially enclosing a region adjacent the rotating beam deflector, the screen structure to reduce gas turbulence in the region of the beam deflector.

2. The light scanner of claim 1, wherein the screen structure has a hole through which the deflector deflects the incoming light beam in response to being rotationally aligned therewith.

3. The light scanner of claim 1, wherein the screen structure forms a cylindrical cavity about the beam deflector.

4. The light scanner of claim 1, wherein the beam deflector has a plurality of facets, each of the facets comprising a mirror to reflect the incoming light beam into the image field in response to being rotationally aligned.

5. The light scanner of claim 1, wherein the motor is adapted to rotate the beam deflector so that the deflected beam passes the image field at least 15,000 times per minute.

6. The scanner of claim 1, further comprising a housing having an inner surface, the screen structure attaching to the housing, and the screen structure and a portion of the inner surface substantially enclosing the region.

7. The light scanner of claim 1, wherein the deflected light beam has a width of less than about $1/1000$ inch at the image field scanned.

8. The light scanner of claim 2, further comprising a laser and wherein the screen structure defines an opening to enable a light beam from the laser to reach the deflector unimpeded by the screen.

9. The light scanner of claim 1, wherein the screen structure is fabricated of wire mesh.

10. The light scanner of claim 1, wherein the screen structure is fabricated of at least one perforated sheet, the perforated sheet having multiple perforations to reduce turbulence of gas flowing through the sheet.

11. The light scanner of claim 1, further comprising a metal housing, the deflector and screen structure being located in a volume having a boundary substantially defined by the metal housing, the motor being physically attached to the housing, the screen structure substantially enclosing the region, and the region being less than about $1/4$ of the volume.

12. The light scanner of claim 1, wherein the beam deflector includes one of a mirror, a diffraction grating, and a holographic deflector.

13. The light scanner of claim 2, wherein the beam reflector has an axis of rotation substantially perpendicular to the direction of the incoming light beam.

14. The light scanner of claim 2, further comprising a screen shroud attaching to said hole, the screen shroud adapted to reduce turbulence near the hole.

15. The light scanner of claim 1, wherein the beam deflector includes a hologon having a plurality of holograms, each hologram to deflect the incoming light beam into the image field in response to being rotationally aligned.

16. A method of optically scanning an image field, comprising:

deflecting an incoming light beam off a deflector to produce a deflected beam;

rotating the deflector to scan an image field with a deflected beam, the deflector rotating in a gaseous environment; and passing a gas flow, resulting from rotation of the deflector, through a turbulence reducing screen.

17. The method of claim 16, further comprising forming an image with the deflected light beam substantially free of turbulence banding.

18. The method of claim 16, wherein the step of rotating includes turning the beam deflector in ambient air.

* * * * *